United States Patent [19]
Prince, Jr.

[11] Patent Number: 5,570,494
[45] Date of Patent: Nov. 5, 1996

[54] SHAFT SEAL FINISHING DIE

[75] Inventor: James E. Prince, Jr., Sumter, S.C.

[73] Assignee: Federal-Mogul Corporation, Southfield, Mich.

[21] Appl. No.: 372,477

[22] Filed: Jan. 13, 1995

[51] Int. Cl.⁶ .................................................. B23P 23/04
[52] U.S. Cl. .......................... 29/33 K; 29/888.3; 72/325; 83/54; 83/682
[58] Field of Search ............................. 29/33 R516, 515, 29/566, 566.1, 508, 33 K, 888.3, 898.11; 72/333, 416, 417, 325; 83/54, 682

[56] References Cited

U.S. PATENT DOCUMENTS

| | | | |
|---|---|---|---|
| 3,271,988 | 9/1966 | Klinksier | 83/54 |
| 3,739,444 | 6/1973 | Vargo | 29/898.11 |
| 3,828,411 | 8/1974 | Zahn | 29/898.11 |
| 5,140,881 | 8/1992 | Aizaki et al. | 83/54 X |

FOREIGN PATENT DOCUMENTS

| | | | |
|---|---|---|---|
| 697229 | 11/1979 | U.S.S.R. | 72/325 |
| 1117103 | 10/1984 | U.S.S.R. | 72/325 |

*Primary Examiner*—William R. Briggs
*Attorney, Agent, or Firm*—Lawrence J. Shurupoff

[57] ABSTRACT

A finishing die is used to assemble and finish a shaft sealing. The die performs the multiple functions of staking a metal case to an elastomeric sealing boot, punching a drain hole in the side surface of the boot, and punching a hole locator notch in a flange of the metal case. The finishing die includes a carrier having a cam-type drive connection with a hole punching device so that, during the closing stroke of the forming die, the hole forming device is driven in a transverse direction to form a drain hole in the side of an elastomeric sealing boot which forms part of the shaft seal.

18 Claims, 3 Drawing Sheets

SHAFT SEAL FINISHING DIE

BACKGROUND OF THE INVENTION

1. Field of the Invention

The present invention relates in general to an apparatus for processing and assembling radial lip shaft seals.

2. Description of Prior Developments

An automotive transmission shaft generally has a section exposed to the ambient at the point where the shaft emerges from the transmission housing. Under conventional practice, the joint between the rotary transmission shaft and the associated transmission housing is sealed by an annular sealing unit such as a transmission seal which is clamped or otherwise secured to the end face of the housing.

The transmission seal commonly includes an annular metal case having a circular side wall and an outwardly extending flange which provides a mounting surface for the metal case. The transmission seal further includes an annular elastomeric boot secured to the metal case by tangs or stakes formed integrally with the case side walls. An annular staking tool is driven axially against an end edge of the seal case side wall to form and bend the tangs into engagement with the boot side wall such that the boot is securely anchored to the metal case.

The metal case includes a radially inwardly directed wall that supports an elastomeric sealing lip which is engagable against the rotating transmission shaft. The boot also has an inturned auxiliary lip that engages the rotating shaft. The transmission shaft sealing unit thus has multiple seal contact zones with the rotating shaft so as to prevent liquids or solids from passing across the shaft-housing interface. The shaft is oriented to rotate around a generally horizontal axis.

Over time, a gap or clearance can develop between the shaft surface and the inturned lip on the elastomeric sealing boot. Atmospheric water can condense or migrate into the vacant space within the boot. Water can collect within the boot and adversely affect the performance of the sealing unit.

In order to prevent the accumulation of water in the boot, it is conventional practice to provide a small drain hole in the boot side wall. By locating the sealing unit so that the drain hole is on the undersurface of the unit, any water originating or migrating into the boot will be drained out of the boot without accumulating within the boot.

In order for the drain hole to operate in the intended manner, the sealing unit must be mounted on the transmission housing so that the drain hole is on the undersurface of the sealing unit, i.e. at the six o'clock position when viewed along the shaft axis. In some cases, the sealing unit has been found to be installed incorrectly. In an effort to ensure correct positioning of the sealing unit, it has been a practice to form a locator notch on the flange of the metal case at a point directly opposed to the location of the drain hole in the sealing boot.

The person installing the sealing unit on the transmission housing is instructed to position the unit so that the locator notch in the flange of the metal case is oriented on the upper side of the unit, i.e. at the twelve o'clock position when viewed along the shaft axis. The person installing the sealing unit can readily view the locator notch and be assured that the drain hole is in the correct position if the sealing unit is installed with the locator notch at the twelve o'clock position. The installer does not have to peer underneath the sealing unit to view the drain hole.

Under conventional practice, the locator notch and the drain hole are formed separately at different locations by different tools. The sealing unit is repositioned to permit the separate operations of punching the drain hole in the sealing boot and stamping the locator notch in the metal case flange. Occasionally, through human error, one of the operations will be omitted or misaligned leading to a defective part or defective or unsatisfactory installation. For example, in some cases the locator notch has been misaligned with the drain hole causing the drain hole to be located at an incorrect position such as at the three o'clock or nine o'clock position, thereby preventing effective drainage through the drain hole.

SUMMARY OF THE INVENTION

The present invention is directed to a finishing die that can be used to automatically perform the three separate functions of staking the sealing boot to the metal case, punching the drain hole in the sealing boot and punching the locator notch in the flange of the metal case. The finishing die is constructed so that all three operations are accomplished in a single cycle of the press in which the forming die is mounted. One advantage of this arrangement is that it is impossible for the human operator to forget or misalign any one of the three operations. When the partially assembled sealing unit is fed into the press and subjected to the machine cycle, all three functions are automatically accomplished in proper orientation.

The principal aim of the invention is to ensure that the drain hole and locator notch are always provided in the sealing unit as part of the operation of staking the metal case to the sealing boot. The end result is to achieve essentially one hundred percent quality control without reliance on human eyesight or inspection.

DETAILED DESCRIPTION OF THE PREFERRED EMBODIMENTS

Figure 1:
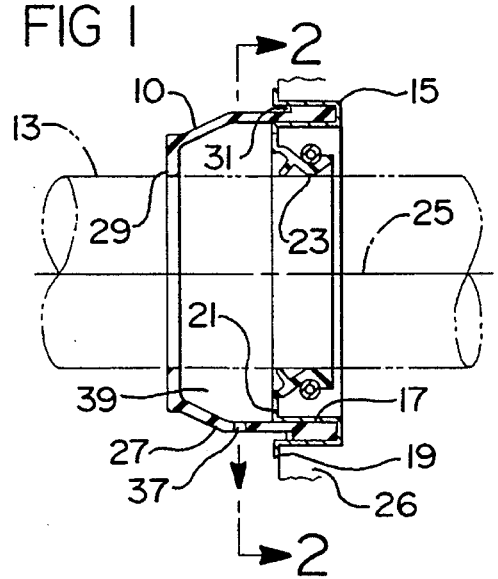
FIG. 1 is a sectional view taken through a shaft sealing unit that can be formed and assembled using a forming die of the present invention.
Figure 2:
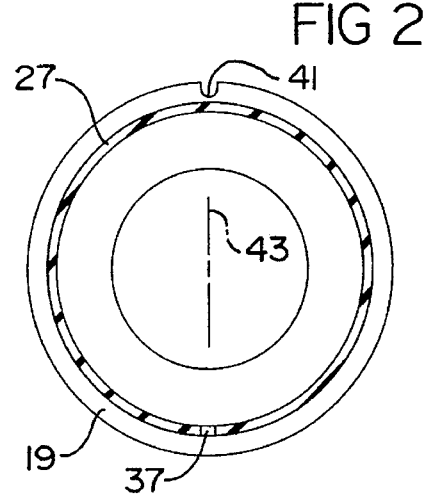
FIG. 2 is a transverse sectional view taken on line 2—2 in FIG. 1.

FIGS. 1 and 2 show an annular sealing unit 10 encircling a rotary shaft 13. The sealing unit includes a metal case 15 that includes an annular side wall 17 and an outwardly radiating flange 19. The metal case further includes an inturned annular wall 21 that supports an elastomeric sealing lip 23. Inner edge areas of lip 23 contact the surface of rotary shaft 13 to seal against liquid leakage along the shaft surface. The shaft is rotatable around a horizontal axis 25.

The annular sealing unit 10 is fixedly mounted in a stationary housing 26 that is fragmentarily shown in FIG. 1. Flange 19 serves as a mounting or positioning flange for locating the sealing unit in the housing.

Sealing unit 10 includes an elastomeric sealing boot 27 that extends axially from metal case 15. An inturned lip 29 on boot 27 engages the shaft surface to provide a secondary seal for excluding dirt and debris from contact with the primary sealing lip 23. Boot 27 extends into an annular slot-like cavity defined by the side wall of the metal case 15, whereby the boot is sealably connected to the case.

In order to prevent boot 27 from separating from metal case 15, the case side wall is deformed at circumferentially spaced points to form tangs or stakes 31. As shown best in FIG. 6, each tang 31 is bent into engagement with a shoulder formed on the boot side wall, whereby the boot is restrained against axial separation from the metal case.

Any suitable number of tangs 31 may be formed on the metal case. Typically, there will be nine such tangs equidistantly spaced around the circumference of the case side wall. Each tang is formed by shearing the metal side wall 17 and simultaneously bending and compacting the sheared material so that the tang acts as a retainer for the associated elastomeric boot 27.

Figure 6:
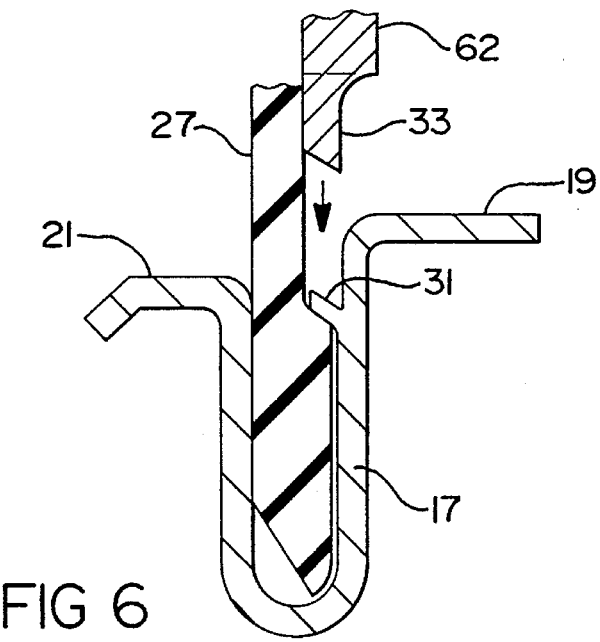
FIG. 6 is an enlarged fragmentary sectional view of the sealing unit of FIG. 3, together with a staking element used to stake the metal case to the sealing boot.

FIG. 6 fragmentarily shows a shearing element 33 that can be moved axially edgewise into the metal wall 17 of seal case 15 to shear material from the wall and compress the sheared material to the configuration shown in FIG. 6. In practice, all of the tangs are formed simultaneously by a single annular tool having a series of circumferentially spaced cutters or shearing elements shaped as shown in FIG. 6.

As further shown in FIGS. 1 and 2, the sealing boot 27 is provided with a drain hole 37 of circular cross section. The drain hole is located at the extreme undersurface of the boot, i.e. at the six o'clock position, so as to be capable of completely draining water from the vacant space 39 within the sealing boot. In order to assist the person installing the sealing unit in determining the proper orientation of the unit, i.e. with the drain hole in the desired six o'clock position, it is the practice to form a locator notch 41 (FIG. 2) in flange 19 at a point diametrically spaced from drain hole 37.

As shown in FIG. 2, the drain hole 37 and locator notch 41 are oriented on an imaginary diametrical plane 43 such that, when the sealing unit is properly installed in the shaft housing, the locator notch 41 will face upwardly, i.e. notch 41 will be in the twelve o'clock position. The installer is trained to orient the sealing unit so that notch 41 is in the twelve o'clock position, using notch 41 as a visual aid without having to directly peer underneath the boot to ascertain the position of drain hole 37.

The present invention is concerned with a finishing die that can be used to perform the metal staking operation, the hole-punching operation, and the notch-punching operation with a single cycle of a conventional press. The finishing die is designed to simultaneously enable tangs 31, drain hole 37 and locator notch 41 to be formed automatically without repositioning the sealing unit 10 between the different operations. By automatically performing all of the operations in a single machine cycle, the human operator avoids the need for inspecting each sealing unit at various stages in its manufacture for assurance that all three operations have been performed correctly.

Figure 4:
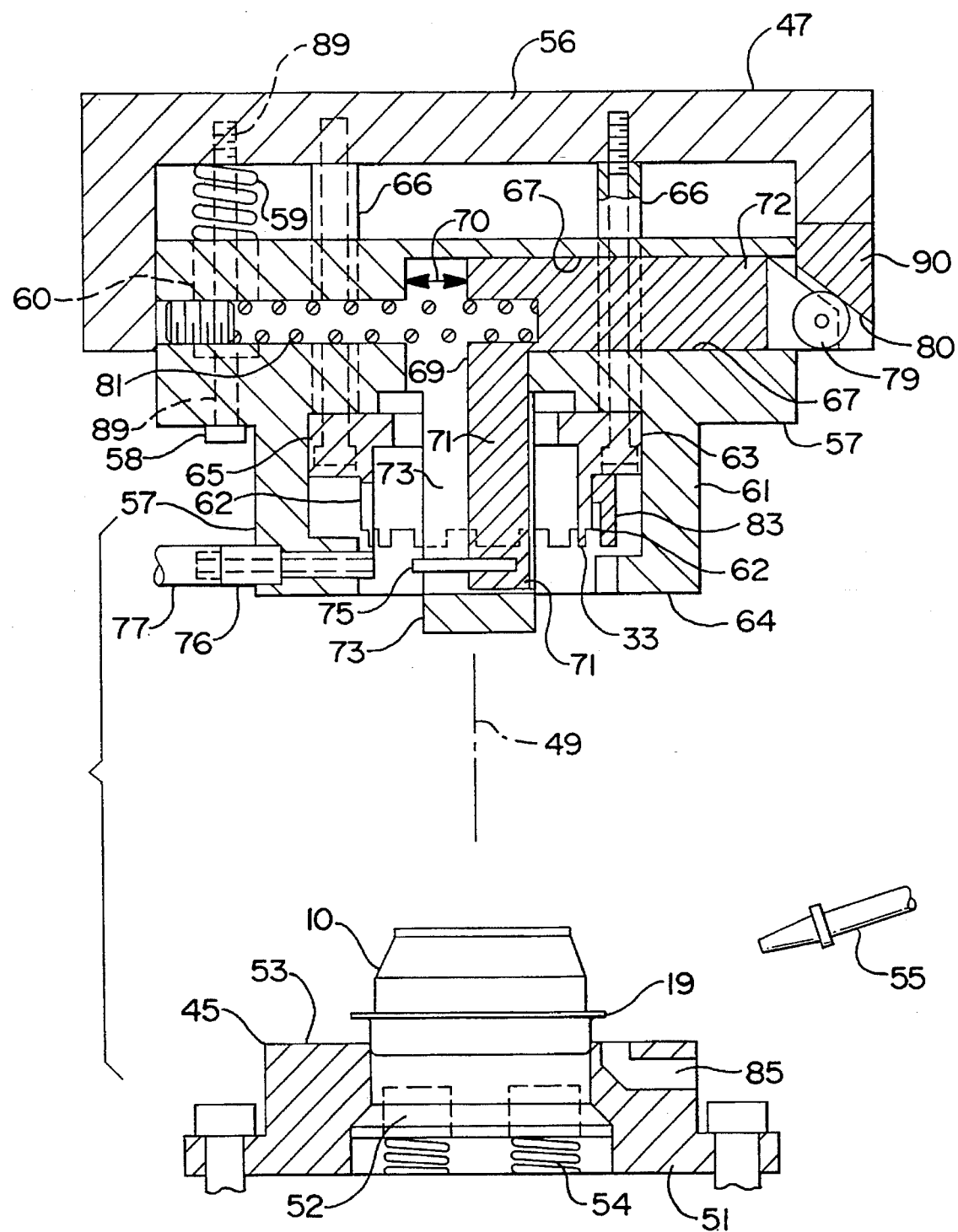
FIG. 4 is an elevational view, on a reduced scale, showing the FIG. 3 forming die in the open position, i.e. prior to closure of the upper and lower die assemblies.
Figure 5:
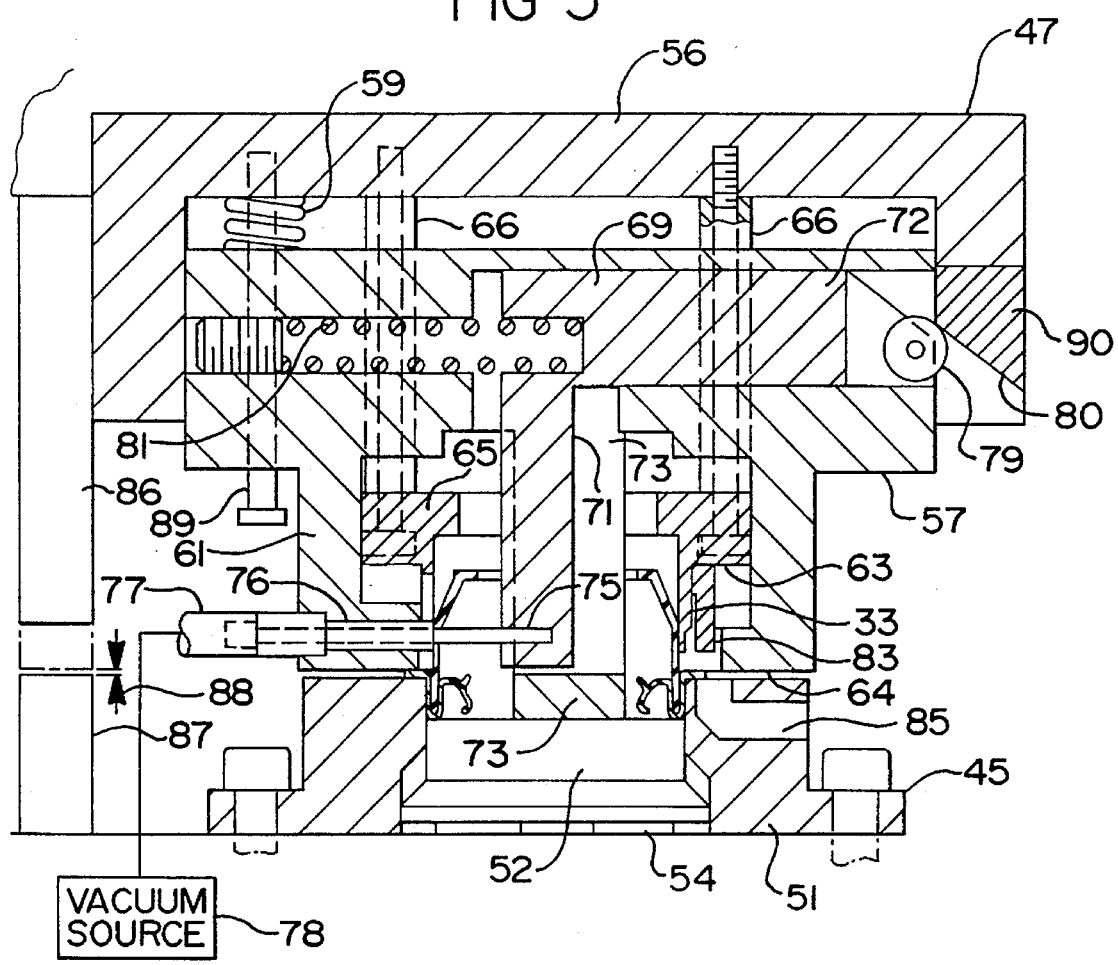
FIG. 5 is a view taken in the same direction as FIG. 4 but showing the die assemblies in a partially closed position.

Referring to FIG. 4, there is shown a finishing die in an open or separated condition. FIG. 5 shows the finishing die in a partially closed position wherein a hole-forming punch extends through the sealing boot of the shaft-sealing unit, and an annular staking device is not yet in contact with the metal case 15. The upper and lower die assemblies are mounted in a conventional stamping press, not shown, whereby the press supplies the power to operate the die assemblies. Typically, the lower die assembly will be stationary, and the upper die assembly will be mounted on a ram for vertical motion along a central vertical axis 49 (FIG. 4).

Figure 3:
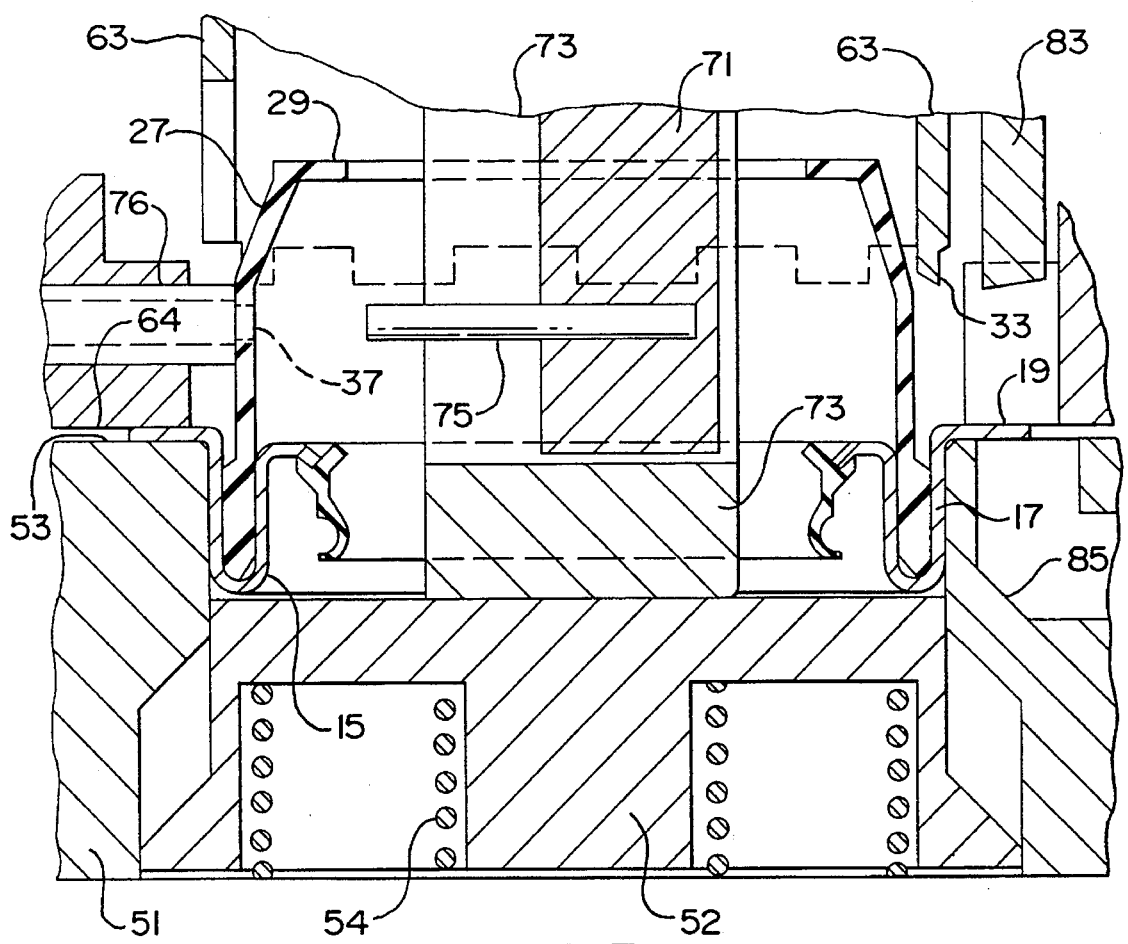
FIG. 3 is an enlarged fragmentary sectional view showing the FIG. 1 shaft sealing unit positioned in a forming die constructed according to the present invention. The die is shown in a fragmentary fashion in FIG. 3.

The lower die assembly 45 includes an annular support member 51 having an upper surface 53 adapted to act as a seating surface for the flange 19 on metal case 15, as shown in FIGS. 3, 4 and 5. Member 51 defines a central circular opening that slidably accommodates a platform 52 biased upwardly by coil springs 54. FIG. 4 shows platform 53 in a raised position wherein its flat upper surface is only slightly depressed below the level of flange-support surface 53. The partially assembled shaft sealing unit 10 is placed on platform 52 prior to operation of the forming die. Such placement of the shaft-sealing unit can be performed manually or mechanically, e.g., by means of a belt conveyor and feed arm cycled in timed relation to the press. The feeding system is not shown in the drawings.

Platform 52 serves as a temporary receiver for the partially assembled shaft-sealing unit, and also as an ejector for popping the shaft sealing unit out of the finishing die after the press cycle. Springs 54 provide the power for ejecting the assembled sealing unit upwardly. The ejected sealing unit can be moved laterally by means of a jet of compressed air discharged from an associated hose 55 (FIG. 4) stationed near the press.

The upper die assembly 47 includes a carrier 56 that includes a circular plate having a downwardly extending peripheral side wall that forms a guide for a flange-clamping member 57. A plurality of coil springs 59 is trained between carrier 56 and clamping member 57 to normally bias member 57 downwardly from the carrier when the forming die is in the FIG. 4 open condition.

The number of springs 59 can be varied while still practicing the invention. Typically, there will be four springs 59 equidistantly spaced in the circumferential direction. Each spring 59 has an upper and lower end portion located within a recess 60 in the clamping member 57. Preferably, a guide bolt 89 is threadably joined to carrier 56 for stabilizing each spring 59. Each guide bolt extends through the spring and through a clearance hole in member 57 so that its head 58 serves as a stop for limiting the motion of member 57 away from carrier 56.

Flange-clamping member 57 includes a cylindrical sleeve 61 that forms a guide for an annular staking member 63. The staking member includes an annular piston 65 slidably guided by sleeve 61 and a relatively thin annular wall 62 having a lower edge configured to form the circumferentially spaced shearing elements 33, better shown in FIG. 6. Typically, there are nine shearing elements equidistantly spaced around the circumference of wall 62. Cylindrical sleeve 61 has a lower edge 64 that is adapted to engage flange 19 of metal case 15 when carrier 56 is moved downward toward support member 51 in a relative sense, i.e. by moving the upper die assembly downwardly. As the edge 64 of sleeve 61 forcibly engages the flange 19, the shaft sealing unit is moved downwardly to the FIG. 5 position wherein flange 19 is clamped between support surface 53 and clamp surface 64.

Annular staking member 63 is connected to carrier 56 by a plurality of suspension arms 66.

The number and configuration of the suspension arms can be varied while still practicing the invention. As shown, each suspension arm includes a bolt having a head seated against the underface of piston 65 and a threaded shank threaded into carrier 56. Each suspension arm further includes a spacer sleeve surrounding the bolt.

Each spacer sleeve extends through a clearance opening in flange clamping member 57 so that staking member 63 is movable with carrier 56. Shoulder bolt 89 forms a stop for limiting the motion of flange clamping member 57 away from carrier 56. Member 57 can float up and down within carrier 56 within limits established by shoulder bolt 89.

As further seen in FIG. 4, flange clamping member 57 defines a horizontal slideway 67 that provides slidable support for a hole punching device 69. The hole punching device includes a slide element 72 movable within slideway 67, as indicated by arrow 70, and a downwardly-extending arm 71 located within a U-shaped guide structure 73 carried by flange clamping member 57.

In the drawings, flange-clamping member 57 is shown as a one-piece structure. However, it will be appreciated that in practice member 57 will be formed of multiple component parts for manufacturing and assembling purposes.

A cylindrical punch 75 extends horizontally from arm 71, whereby horizontal motion of the hole punching device 69 in a leftward direction causes the punch to penetrate the elastomeric wall of boot 27 to form the drain hole 37. FIG. 4 shows the hole punching device 69 in a retracted position, wherein punch 75 is spaced from the internal surface of boot 27. FIG. 5 shows the hole punching device 69 in an advanced position wherein punch 75 extends through the boot wall to sever a circular section of material from the boot.

Boot 27 is formed of an elastomeric flexible material that can be deflected by contact with punch 75, instead of being cut or severed by the punch, if the boot material is unsupported against the undesired deflection. To provide backup support for the boot material, there is mounted on member 57 a hollow tubular die member 76 having a die opening aligned with punch 75. The annular end surface of member 76 is in near proximity to the outer side surface of boot 27 so that, when punch 75 exerts pressure on the boot, the boot material is squeezed between member 76 and the punch. The punch thereby is enabled to cut through the boot material to form the aforementioned drain hole 37.

The outer or left end of die member 76 is connected to one end of a flexible hose 77 that connects with a vacuum source 78 (FIG. 5). During operation of the press, the vacuum source will maintain the passage in member 76 in a subatmospheric condition so that the small slugs of material severed from the boots 27 are drawn out of member 76 for disposal. Vacuum source 78 can in practice be an industrial vacuum cleaner.

The transverse horizontal motion of hole forming device 69 is achieved by means of a drive connection between device 69 and carrier 56. As shown in FIG. 4, the slide element 72 supports a roller 79 that is in rolling engagement with a cam surface 80 on carrier 56. A compression spring 81 biases the hole punching device 69 in a rightward direction so that roller 79 is always in contact with the carrier. Roller 79 serves as a cam follower for cam surface 80.

Cam surface 80 is preferably formed by a block-like insert 90 formed separately from carrier 56, whereby insert 90 can be adjusted incrementally to achieve a desired stroke of slide element 72 in the arrow 70 directions. Slide element 72 is moved leftwardly from its FIG. 4 position when the lower edge 64 of member 57 is in effective abutment with the lower die assembly as shown in FIG. 5. Slide element 72 is returned to the FIG. 4 position by spring 81.

As carrier 56 moves downwardly from the FIG. 4 position, lower edge 64 contacts flange 19 on metal case 15 thereby forcing the shaft sealing unit 10 to shift downwardly to the FIG. 5 clamped position. FIG. 3 shows the condition where the metal case is clamped, but punch 75 has not yet started its leftward advance toward boot 27. The lower end of guide structure 73 contacts platform 52 to space the platform from the lower edge of metal case 15. The shaft-sealing unit is thus fixed in place by the clamping action of surfaces 53 and 64 on flange 19.

Continued downward motion of carrier 56 causes cam surface 80 to drive hole punching device 69 in a leftward direction while the flange clamping member 57 is shifting relatively upwardly in carrier 56. Coil springs 59 exert a downward biasing force on member 57 for maintaining a desired clamping pressure on case flange 19.

The aforementioned locator notch 41 in FIG. 2 is formed by a metal punch 83 that is indirectly carried by carrier 56. As carrier 56 continues its downward motion beyond the FIG. 4 position, the staking or shearing elements 33 penetrate the metal case to form the tangs 31. At the same time, punch 83 penetrates flange 19 to form the locator opening or notch 41. A passage 85 is formed in support member 51 to receive the metal slug generated by the punching operation.

During the last stages of the downstroke, the roller 79 will ride cam surface 80 into contact with the inner side surface of carrier 56. The hole forming punch 75 has a sufficient stroke to extend into passage member 76 far enough to produce the drain hole. Metal punch 83 and hole forming punch 75 are located on a diametrical plane through central axis 49 so that the drain hole and locator notch are in the desired locations in the shaft-sealing unit.

The press on the die can be equipped with a gage to ensure against excessive motion of the staking member 63 as would damage sealing unit 10. As shown in FIG. 5, the gage includes rods 86 and 87 carried by the upper and lower dies. The stroke of the press is adjusted so that at the point of maximum closure, the ends of the rods are spaced apart a small measurable distance 88. In practice, distance 88 can be about 0.007 inch, i.e. some distance that can be measured by inserting a sheet of known thickness in the space between the rod ends.

After the staking and metal punching operations, the die assemblies are returned to the FIG. 4 open condition ready for insertion of the next unit 10 into the press. With the illustrated construction, it is possible to achieve a reasonably high production, in the neighborhood of thirty units per minute. The press can be a standard press without special modifications. Power for the hole punching operation in boot 27 is provided by the drive connection between carrier 56 and hole punching device 69. No special modifications of the press are required.

Obviously, numerous modifications and variations of the present invention are possible in the light of the above teachings. It is therefore to be understood that within the scope of the appended claims, the invention may be practiced otherwise than as specifically described herein.

What is claimed is:

1. A finishing die for use on a shaft-sealing unit, wherein the sealing unit comprises a metal case having a circular side wall having an outwardly extending flange, and a flexible sealing boot extending axially from said case, said forming die comprising:

a lower die assembly, and an upper die assembly movable toward each other along a vertical axis;

said lower die assembly comprising an annular support member having an opening sized to receive the case therein;

said upper die assembly comprising an overhead carrier, a flange-clamping assembly slidably mounted on said carrier for vertical movement therealong, a hole forming device slidably mounted on said flange clamping assembly for transverse horizontal movement, and an annular staking device suspended from said carrier;

said clamping assembly being engagable with the case flange, whereby said flange is clamped to said annular support member;

said carrier having a drive connection with said hole forming device, such that relative movement of the carrier toward the lower die assembly causes the hole forming device to be driven horizontally to form a hole in the sealing boot; and said annular staking device being oriented so that after the hole has been formed in the sealing boot, the staking device forcibly engages the case side wall to stake the case to the sealing boot.

2. The finishing die of claim 1, wherein said upper die assembly comprises a metal punch operable to form an opening in the case flange during the staking operation.

3. The finishing die of claim 2, wherein the metal punch is oriented so that the hole in the boot and the opening in the case flange are located on a diametrical plane taken through the sealing unit.

4. The finishing die of claim 1, wherein said hole forming device comprises a hole punch having a horizontal axis and a back-up assembly carried by said flange clamping assembly in horizontal registry with said hole punch.

5. The finishing die of claim 4, wherein said back-up assembly has a passage therein for receiving material severed from the boot by the hole punch.

6. The finishing die of claim 5 and further comprising a vacuum source connected to said passage for moving severed material through the passage.

7. The finishing die of claim 1, wherein said drive connection comprises a cam on the carrier and a cam follower on the hole forming device.

8. The finishing die of claim 7, wherein said cam follower is a roller.

9. The finishing die of claim 1, wherein said flange clamping assembly comprises a horizontal slideway, and said hole forming device comprises a slide element movable along said slideway, said drive connection comprising a cam on the carrier and a cam follower on said slide element.

10. The finishing die of claim 9, wherein said cam follower is a roller.

11. The finishing die of claim 1, and further comprising a spring biasing said flange clamping assembly downwardly from said carrier, whereby said flange clamping assembly remains engaged with the case flange during the staking operation.

12. The finishing die of claim 1, wherein said flange clamping assembly comprises a cylindrical sleeve, said staking device comprising a piston slidably positioned in said sleeve, and plural suspension arms extending between said piston and said carrier.

13. The finishing die of claim 1, wherein said lower die assembly comprises an ejector located in the opening in said annular support member, whereby the sealing unit is automatically moved out of said opening after the staking operation.

14. The finishing die of claim 13, wherein said ejector comprises a platform movably positioned in said opening and said spring biasing said platform upwardly within said support member.

15. A finishing die for use on a sealing unit, wherein the sealing unit comprises an annular metal case and a flexible sealing boot extending axially from said case, said forming die comprising:

a first die assembly for supporting the metal case, and a second die assembly having means for clamping the metal case to said first die assembly;

said second die assembly comprising a hole forming means movable in a direction transverse to the sealing unit axis to form a drain hole in the sealing boot;

said second die assembly further comprising a staking means movable along the sealing unit axis to stake the metal case to the sealing boot;

said second die assembly further comprising a metal punch movable with said staking means to form a locator opening in the metal case.

16. The finishing die of claim 15, wherein said second die assembly comprises a carrier and a cam drive connection between said carrier and said hole forming means, whereby relative movement of said carrier toward said first die assembly causes the hole forming means to move in a direction transverse to the sealing unit axis.

17. The finishing die of claim 15, wherein said hole forming means comprises a hole punch movable through the sealing boot wall to form a drain hole and a backup means carried by said clamping means in registry with said hole punch.

18. The finishing die of claim 17, wherein said backup means has a passage therein for receiving material severed from the boot by the hole punch and a vacuum means connected to said punch for moving severed material through the passage.

* * * * *